A. ENGLE.
PROCESS OF DISPOSING OF WASTE PRODUCTS AND CONSERVING CHEMICAL CONSTITUENTS THEREOF.
APPLICATION FILED DEC. 2, 1918.
1,330,435. Patented Feb. 10, 1920.
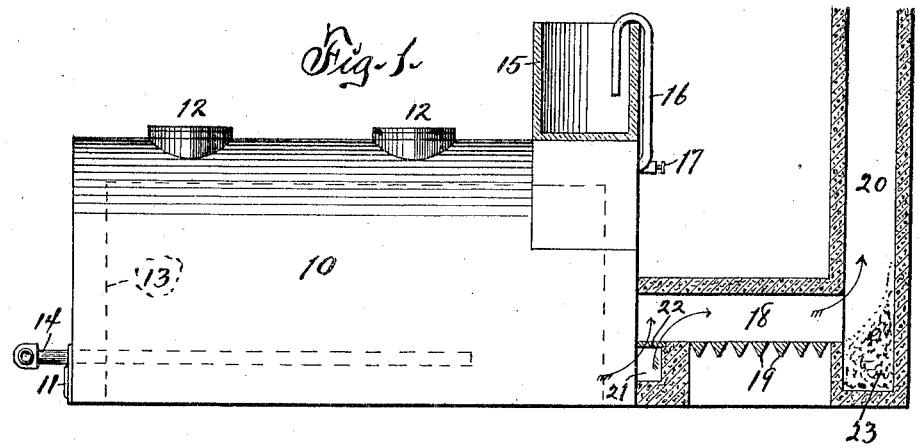
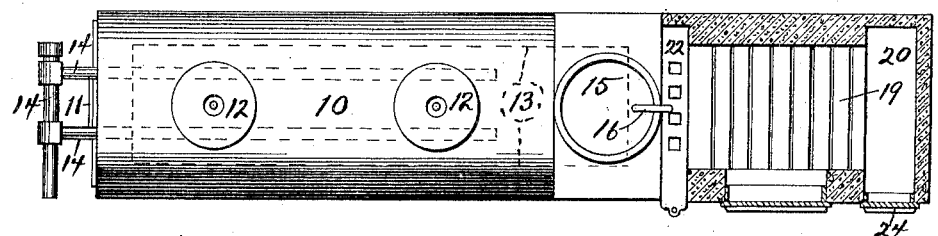
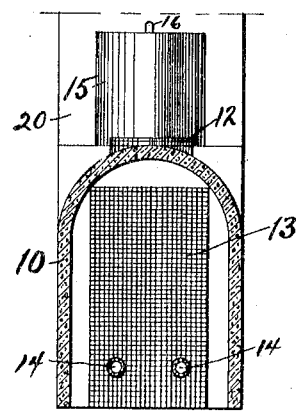
Inventor:
Andrew Engle.
By Silas Sweet
Atty

UNITED STATES PATENT OFFICE.

ANDREW ENGLE, OF MOUND PRAIRIE TOWNSHIP, JASPER COUNTY, IOWA, ASSIGNOR OF ONE-HALF TO JAMES J. ENGLE, OF MOUND PRAIRIE TOWNSHIP, IOWA.

PROCESS OF DISPOSING OF WASTE PRODUCTS AND CONSERVING CHEMICAL CONSTITUENTS THEREOF.

1,330,435.  Specification of Letters Patent.  Patented Feb. 10, 1920.

Application filed December 2, 1918. Serial No. 264,975.

*To all whom it may concern:*

Be it known that I, ANDREW ENGLE, a citizen of the United States of America, and resident of Mound Prairie township, Jasper county, Iowa, have invented a new and useful Process of Disposing of Waste Products and Conserving Chemical Constituents Thereof, of which the following is a specification.

The object of this invention is to provide an improved process or method of disposing of waste products such as night-soil, garbage, weeds, dead animals and similar or associated rubbish usually gathered and removed from cities and towns, and conserving and utilizing chemical constituents thereof such as nitrates and ammonia.

My invention consists in the process or method hereinafter described and claimed.

In carrying out my improved process I may employ means and devices, one embodiment of which is illustrated by the accompanying drawing, including—

Figure 1, a side elevation, partly in section; Fig. 2, a plan, partly in section; and Fig. 3, a front elevation, partly in section.

In the construction of the means employed, the numeral 10 designates a container, housing, vault, structure or building, of generally rectangular form in plan, provided with end walls and an arched roof. This structure preferably is composed or built up of concrete, either monolithic or blocks, but for reasons hereinafter mentioned it may be found desirable to construct it of unbaked clay or sundried bricks such as adobe. However the substance of the structure 10 is not immediately important, other characteristics and the use of said structure commanding principal attention. The housing 10 may be of any desired dimensions; but in this connection attention is directed to the desirability that said housing have relatively large capacity, such, for instance, as would care for the scavenged products of a given area for a week. The housing 10 preferably is provided with a door 11 in one wall and man-holes or ingress ports in its roof, the latter being closable, and ordinarily closed, by covers 12. A cage 13, preferably made of reticulated metal such as woven wire, is located within and spaced from the walls of the housing 10 and said cage is open at its top and surrounds the man-holes in the roof of the structure. The spacing of the cage from the walls of the structure preferably is sufficient for the passing or travel of a man between them. A series of air-supply pipes 14, in any desired number, is mounted through one wall of the housing 10 and extends within the cage 13. Air, under pressure, is supplied to the pipes 14 in any desired manner such as by attachment of an air-pump (not shown) to said pipes exteriorly of the structure. A container 15, or jar, preferably made of vitrified clay or glass, is mounted in any suitable location such as on one end portion of the structure 10, and a discharge pipe 16, preferably controlled by a valve 17, communicates at one end with the interior of the upper portion of the structure 10 and is recurved and communicates at the other end with the interior of the container 15. The terminal end of the pipe 16 preferably is submerged in a liquid, such as sulfuric acid, within the container 15. A furnace is located adjacent to the structure 10 and is provided with a fire-box 18, grate 19 and chimney 20. In the grate 19 a fire is maintained at times and the fuel employed preferably is high in sulfur content and may be largely composed of sulfur balls. Communication is provided between the fire-box 18 and the interior of the structure 10, such as by a box 21, and said communication is controlled by a valve or damper 22.

In carrying out my improved process with the means above described, the cage 13 is filled, through the man-holes, with the available waste products and refuse, and lime, preferably in solution with water, is applied to the mass in the cage in proportions sufficient to limit acid development and for disinfecting purposes therein. After the cage is filled, the man-holes are covered and the mass allowed to rest to establish putrefaction, then air is pumped or introduced under pressure to the mass through the pipes 14 to the end of thoroughly aerating and ventilating the mass. In passing through the mass, the air becomes saturated with ammonia and carries said ammonia out of the structure in either of two ways, viz., through the pipe 16 and bath in the container 15 to the end of depositing the ammonia in said bath, or, through the firebox 18 to the end of commingling said ammonia with the sulfur fumes and depositing it with the carbon from the fuel in a soot as indicated by the deposit 23 in Fig. 1. The selective withdrawal of the ammonia is under control of the valves 17 and 22 and may be directed as desired. The ammonia-bearing soot may be removed through a door 24 provided at the base of the chimney and the contents of the container 15 may be removed in any convenient way; and the products thus obtained may be further treated in any desired manner for commercializing them. During the operation of aerating the mass and drawing off the ammonia therefrom, said mass undergoes a physical and chemical transformation, or more than one such transformation. It is deodorized; dried; and decomposed; and becomes a fertilizing composition or substance high in nitrate content and susceptible of grinding and packaging for commerce. Or, the dried mass may be consumed by fire and will yield a large proportion of potash of commercial value. In the latter event, the furnace and chimney will provide draft for combustion in connection with air supplied through the door 11 or pipes 14.

Sometimes it is desirable to utilize the dried mass as a fertilizer on land surrounding or contiguous to the structure, and it is convenient and economical to make the walls and roof of the structure of sundried clay, in order that the structure may be broken down and commingled with the dried mass and thus add bulk and soil elements to the fertilizer. In such condition the clay component of the structure also carries into the resultant composition a quantity of absorbed ammonia. Various bacteria useful in the development of plant life are propagated in the dried mass, kept sweet by the lime and air. Thus considerable tracts of land may be reclaimed and made fit for agriculture through the use of waste products locally.

Any mineral objects contained in the rubbish or waste products are ignored in this operation.

The means described are covered in my co-pending application filed December 2, 1918, Serial Number 264,976.

I claim as my invention—

1. An improved process of disposing of waste products and conserving chemical constituents thereof, which consists in confining the waste products in mass, and aerating said mass until the same is dried.

2. An improved process of disposing of waste products and conserving chemical constituents thereof, which consists in confining waste products in mass, passing currents of air through said mass until the mass is dried and subjecting said currents of air to ammonia-collecting or precipitating media.

3. An improved process of disposing of waste products and conserving chemical constituents thereof, which consists in confining waste products in mass, space being provided for free circulation of air around the mass and between said mass and the confining medium, passing currents of air through said mass until the mass is dried; and subjecting said air-currents to ammonia-collecting or precipitating media after they have traversed the mass.

4. An improved process of disposing of waste products and conserving chemical constituents thereof, which consists in confining waste products in mass, aerating said mass in confinement until the mass is dried, extracting ammonia from the aerating media and collecting said ammonia with carbon after extraction.

Signed at Des Moines, in the county of Polk and State of Iowa, this 21st day of October, 1918.

ANDREW ENGLE.